(12) United States Patent
Fischer et al.

(10) Patent No.: US 6,562,902 B1
(45) Date of Patent: May 13, 2003

(54) NON-REINFORCED THERMOPLASTIC MOULDING MATERIALS

(75) Inventors: Michael Fischer, Ludwigshafen (DE); Manfred Knoll, Wachenheim (DE); Christophe Ginss, Wolxheim (FR); Stephan Berz, Frankfurt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/806,146

(22) PCT Filed: Oct. 1, 1999

(86) PCT No.: PCT/EP99/07265

§ 371 (c)(1),
(2), (4) Date: Mar. 28, 2001

(87) PCT Pub. No.: WO00/20501

PCT Pub. Date: Apr. 13, 2000

(30) Foreign Application Priority Data

Oct. 1, 1998 (DE) ......................................... 198 45 289

(51) Int. Cl.$^7$ .............................................. C08L 33/02
(52) U.S. Cl. ........................................ 525/78; 523/500
(58) Field of Search ............................... 523/500; 525/78

(56) References Cited

U.S. PATENT DOCUMENTS

| | | |
|---|---|---|
| 4,940,746 A | 7/1990 | Lausberg |
| 5,219,915 A | 6/1993 | McKee |
| 5,501,898 A | 3/1996 | Foettinger |
| 5,849,827 A * | 12/1998 | Bodiger ........................ 521/423 |
| 5,977,254 A * | 11/1999 | McKee ........................... 525/64 |
| 6,136,918 A * | 10/2000 | Mishima ....................... 524/804 |

FOREIGN PATENT DOCUMENTS

| | | |
|---|---|---|
| DE | 39 11828 | 10/1990 |
| EP | 471 554 | 2/1992 |
| EP | 643 104 | 3/1995 |

OTHER PUBLICATIONS

Derwent 95–108480/15.

* cited by examiner

Primary Examiner—Edward J. Cain
(74) Attorney, Agent, or Firm—Keil & Weinkauf

(57) ABSTRACT

A thermoplastic molding composition comprises, based on the total of components A to C and, if desired, D and E, which in total give 100% by weight,
  a) as component A, from 10 to 98% by weight of at least one aromatic polyester,
  b) as component B, from 1 to 50% by weight of at least one particulate graft copolymer whose soft phase has a glass transition temperature below 0° C. and whose median particle size is from 50 to 1000 nm,
  c) as component C, from 1 to 50% by weight of at least one copolymer made from the following monomers
    c1) as component C1, from 50 to 90% by weight of at least one vinylaromatic monomer, and
    c2) as component C2, from 10 to 25% by weight of acrylonitrile and/or methacrylonitrile,
  d) as component D, from 0 to 25% by weight of other compatible polymers hormogeneously miscible with components A and/or C or dispersible in these, and
  e) as component E, from 0 to 10% by weight of conventional additives, such as UV stabilizers, carbon black, pigments, oxidation retarders, lubricants and mold-release agents.

Moldings made from these molding compositions and used in motor vehicle interiors are also described, as is the use of the molding compositions to produce the moldings.

7 Claims, No Drawings

NON-REINFORCED THERMOPLASTIC MOULDING MATERIALS

The invention relates to unreinforced thermoplastic molding compositions, moldings made therefrom, and also to the use of the molding compositions to produce the moldings.

Moldings made from polymeric materials and used in the interior of motor vehicles have to meet high requirements for heat resistance, mechanical properties, surface properties, aging performance, and also odor performance. Various polymeric materials are currently used to produce moldings for interior applications in motor vehicles.

One material used is ABS. This material has poor UV resistance, poor heat-aging resistance and poor heat resistance (Vicat B softening point<110° C.).

Another material used is ABS/PC (a polymer blend made from acrylonitrile-butadiene-stryene copolymer and polycarbonate). However, this material has unsatisfactory UV resistance, poor heat-aging performance (toughness and elongation at break after heat-aging), disadvantageous surface properties, poor stress cracking resistance for example with respect to plasticizers, and also in particular poor emission properties and poor odor performance. For the purposes of the present invention, odor performance is the tendency of materials, after a specified duration of aging under particular temperature and climatic conditions, to give off volatile constituents which have a discernible odor.

Another material used is ABS/PA (a polymer blend made from ABS and polyamide). ABS/PA, too, has poor UV resistance, poor heat resistance (Vicat B softening point<105° C.), poor heat-aging resistance, high moisture absorption, and also poor flowability.

Another material used is PPE/HIPS (a polymer blend made from polyphenylene oxide and impact-modified polystyrene). Disadvantages of this material are poor flowability, poor UV resistance, foam adhesion and heat-aging resistance, and also poor odor performance.

PET/PC (a polymer blend made from polyethylene terephthalate and polycarbonate) is also used. Disadvantages of this material are its low stress cracking resistance, for example with respect to plasticizers, and also its poor flowability.

PBT/PC is another material used. It has poor flowability and stress cracking resistance.

Most of the materials mentioned above have poor heat resistance, expressed in terms of a low Vicat B softening point (Vicat B<130° C.), and also poor heat-aging resistance. Good heat resistance and heat-aging resistance of the materials used is, however, essential since the temperature of the motor vehicle interior can rise considerably, especially when exposed to solar radiation.

The disadvantages mentioned above can be removed by using polymeric materials based on PBT/ASA/PSAN (polymer blends made from polybutylene terephthalate, acrylonitrile-styrene-acrylate copolymer and polystyrene-acrylonitrile copolymer). Materials of this type are generally disclosed in DE-A 39 11 828. The working examples relate to molding compositions in which the PSAN copolymers have a high proportion of acrylonitrile. However, like most of the abovementioned materials, moldings made from these molding compositions have poor emission performance and poor odor performance. The glass-fiber content of these molding compositions also has a disadvantageous effect on surface properties and on the toughness of moldings made from the compositions.

It is an object of the present invention to provide molding compositions suitable for producing moldings which are used in the interior of motor vehicles and have an advantageous property profile in terms of their mechanical, optical and surface properties, and also in particular have good heat resistance and heat-aging resistance, and good emission performance and/or odor performance.

We have found that this object is achieved by means of a thermoplastic molding composition comprising, based on the total of components A to C and, if desired, D and E, which in total give 100% by weight, a) as component A, from 10 to 98% by weight of at least one aromatic polyester, b) as component B, from 1 to 50% by weight of at least one particulate graft copolymer whose soft phase has a glass transition temperature below 0° C. and whose median particle size is from 50 to 1000 nm, c) as component C, from 1 to 50% by weight of at least one copolymer made from the following monomers c1) as component C1, from 50 to 90% by weight of at least one vinylaromatic monomer, and c2) as component C2, from 10 to 25% by weight of acrylonitrile and/or methacrylonitrile, d) as component D, from 0 to 25% by weight of other compatible polymers homogeneously miscible with components A and/or C or dispersible in these, and e) as component E, from 0 to 10% by weight of conventional additives, such as UV stabilizers, carbon black, pigments, oxidation retarder, lubricants and mold-release agents.

The novel molding composition comprises, as component A, from 10 to 98% by weight, preferably from 20 to 75% by weight, particularly preferably from 30 to 60% by weight, of an aromatic polyester. The polyesters present in the novel molding compositions are known per se.

The polyesters may be prepared by reacting terephthalic acid, its esters or other ester-forming derivatives, with 1,4-butanediol, 1,3-propanediol or, respectively, 1,2-ethanediol, in a manner known per se.

Up to 20 mol % of the terephthalic acid may be replaced by other dicarboxylic acids. Those which may be mentioned, merely as examples, are naphthalenedi-carboxylic acids, isophthalic acid, adipic acid, azeleic acid, sebacic acid, dodecanedioic acid and cyclohexanedicarboxylic acids, mixtures of these carboxylic acids, and ester-forming derivatives of the same.

Up to 20 mol % of the dihydroxy compounds 1,4-butanediol, 1,3-propanediol or, respectively, 1,2-ethanediol may be replaced by other dihydroxy compounds, e.g. 1,6-hexanediol, 1,4-hexanediol, 1,4-cyclohexanediol, 1,4-di (hydroxymethyl)cyclohexane, bisphenol A, neopentyl glycol, mixtures of these diols, or also ester-forming derivatives of the same.

Preferred aromatic polyesters are polyethylene terephthalate (PET), polytrimethylene terephthalate (PTT) and in particular polybutylene terephthalate (PBT), whose formation involves exclusively terephthalic acid and the appropriate diols 1,2-ethanediol, 1,3-propanediol and 1,4-butanediol. Some or all of the aromatic polyesters may be used in the form of recycled polyester materials, such as PET regrind from bottle material or from wastes from bottle production.

In a particularly preferred embodiment component A is composed of a1) from 60 to 100% by weight, in particular from 80 to 95% by weight, of polybutylene terephthalate, and a2) from 0 to 40% by weight, in particular from 5 to 20% by weight, of polyethylene terephthalate.

The novel molding composition comprises, as component B, from 1 to 50% by weight, preferably from 1 to 25% by weight, particularly preferably from 2 to 15% by weight, in particular from 2 to 10% by weight, of at least one particulate graft copolymer with a glass transition temperature of the soft phase below 0° C. and with a median particle size of from 50 to 1000 nm.

Component B is preferably a graft copolymer made from
b1) from 50 to 90% by weight of a particulate graft base B1 with a glass transition temperature below 0° C., and
b2) from 10 to 50% by weight of a graft B2 made from the following monomers
   b21) as component B21, from 50 to 90% by weight of a vinylaromatic monomer, and
   b22) as component B22, from 10 to 49% by weight of acrylonitrile and/or methacrylonitrile.

The particulate graft base B1 may be composed of from 70 to 100% by weight of a conjugated diene and from 0 to 30% by weight of a bifunctional monomer having two non-conjugated olefinic double bonds. Graft bases of this type are used, for example, as component B in ABS polymers or MBS polymers.

In a preferred embodiment of the invention the graft base B1 is composed of the following monomers:
b11) as component B11, from 75 to 99.9% by weight of a $C_1$–$C_{10}$-alkyl acrylate,
b12) as component B12, from 0.1 to 10% by weight of at least one polyfunctional monomer having at least two non-conjugated olefinic double bonds, and
b13) as component B 13, from 0 to 24.9% by weight of one or more other copolymerizable monomers.

The graft base B1 is an elastomer whose glass transition temperature is preferably below −20° C., particularly preferably below −30° C.

The main monomers B11 used to prepare the elastomer are acrylates having from 1 to 10 carbon atoms, in particular from 4 to 8 carbon atoms, in the alcohol component. Particularly preferred monomers B11 are isobutyl and n-butyl acrylate, and also 2-ethylhexyl acrylate, particularly preferably the latter two.

Besides the acrylates, the crosslinking monomer B12 used is from 0.1 to 10% by weight, preferably from 0.1 to 5% by weight, particularly preferably from 1 to 4% by weight, of a polyfunctional monomer having at least two non-conjugated olefinic double bonds. Examples of these are divinylbenzene, diallyl fumarate, diallyl phthalate, triallyl cyanurate, triallyl isocyanurate, tricyclodecenyl acrylate and dihydrodicyclopentadienyl acrylate, particularly preferably the latter two.

Besides the monomers B11 and B12, the structure of the graft base B1 may also involve up to 24.9% by weight, preferably up to 20% by weight, of other copolymerizable monomers, preferably 1,3-butadiene, styrene, α-methylstyrene, acrylonitrile, methacrylonitrile and $C_1$–$C_8$-alkyl methacrylates, or mixtures of these monomers. In a particularly preferred embodiment no 1,3-butadiene is present in the graft base B1, and the graft base B1 in particular is composed exclusively of components B11 and B12.

Grafted onto the graft base B1 there is a graft B2 made from the following monomers:
b21) as component B21, from 50 to 90% by weight, preferably from 60 to 90% by weight, particularly preferably from 65 to 80% by weight, of a vinylaromatic monomer, and
b22) as component B22, from 10 to 50% by weight, preferably from 10 to 40% by weight, particularly preferably from 20 to 35% by weight, of acrylonitrile or methacrylonitrile or mixtures of these.

Examples of vinylaromatic monomers are unsubstituted styrene and substituted styrenes, such as α-methylstyrene, p-chlorostyrene and p-chloro-α-methylstyrene. Preference is given to unsubstituted styrene and α-methylstyrene, particularly unsubstituted styrene.

In one embodiment of the invention the median particle size of component B is from 50 to 200 nm, preferably about 100 nm.

In another embodiment of the invention the median particle size of component B is from 200 to 1000 nm, preferably about 500 nm.

In another embodiment of the invention component B has bimodal particle size distribution and is composed of from 10 to 90% by weight, preferably from 30 to 90% by weight, particularly preferably from 50 to 75% by weight, of a fine-particle graft copolymer with a median particle size of from 50 to 200 nm, preferably about 100 nm, and from 10 to 90% by weight, preferably from 10 to 70% by weight, particularly preferably from 25 to 50% by weight, of a coarse-particle graft copolymer with a median particle size of from 250 to 1000 nm, preferably about 500 nm.

The median particle size and particle size distribution given are the sizes determined from the integral mass distribution. The median particle sizes according to the invention are in all cases the ponderal median of the particle sizes.

The determination of these is based on the method of W. Scholtan and H. Lange, Kolloid-Z. und Z.-Polymere 250 (1972), pages 782–796, using an analytical ultracentrifuge. The ultracentrifuge measurement gives the integral mass distribution of the particle diameters in a specimen. From this it is possible to deduce what percentage by weight of the particles has a diameter identical to or smaller than a particular size. The median particle diameter, which is also termed the $d_{50}$ of the integral mass distribution, is defined here as the particle diameter at which 50% by weight of the particles have a diameter smaller than that corresponding to the $d_{50}$. Equally, 50% by weight of the particles then have a larger diameter than the $d_{50}$. To describe the breadth of the particle size distribution of the rubber particles, $d_{10}$ and $d_{90}$ values given by the integral mass distribution are utilized alongside the $d_{50}$ value (median particle diameter). The $d_{10}$ and $d_{90}$ of the integral mass distribution are defined similarly to the $d_{50}$ with the difference that they are based on, respectively, 10 and 90% by weight of the particles. The quotient $$(d_{90}-d_{10})/d_{50}=Q$$

is a measure of the breadth of the particle size distribution. Emulsion polymers A which can be used according to the invention as component A preferably have Q less than 0.5, in particular less than 0.35.

The graft copolymer B generally has one or more stages, i.e. it is a polymer composed of a core and of one or more shells. The polymer is composed of a base (graft core) B1 and of, grafted onto this, one, or preferably more than one, stages B2 (graft), known as grafts or graft shells.

By grafting one or more times it is possible to apply one or more graft shells to the rubber particles. Each graft shell may have a different make up. In addition to the grafting monomers and together with these, polyfunctional crosslinking monomers or monomers containing reactive groups may be grafted on (see, for example, EP-A 0 230 282, DE-A 36 01 419, EP-A 0 269 861).

In one embodiment of the invention crosslinked acrylate polymers with a glass transition temperature below 0° C.

serve as graft base B1. The crosslinked acrylate polymers should preferably have a glass transition temperature below −20° C., in particular below −30° C.

In principle the structure of the graft copolymer may also have two or more layers, where at least one inner layer has a glass transition temperature below 0° C. and the outermost layer should have a glass transition temperature above 23° C.

In a preferred embodiment the graft B2 is composed of at least one graft shell. The outermost graft shell of these has a glass transition temperature above 30° C. A polymer formed from the monomers of the graft B2 would have a glass transition temperature above 80° C.

Suitable preparation processes for graft copolymers B are emulsion, solution, bulk and suspension polymerization. The graft copolymers B are preferably prepared by free-radical emulsion polymerization, at temperatures of from 20 to 90° C. using water-soluble and/or oil-soluble initiators, such as peroxodisulfate or benzoyl peroxide, or with the aid of redox initiators. Redox initiators are also suitable for polymerization below 20° C.

Suitable emulsion polymerization processes are described in DE-A-28 26 925, DE-A 31 49358 and in DE-C-12 60 135.

The graft shells are preferably built up in the emulsion polymerization process as described in DE-A-32 27 555, 31 49 357, 31 49 358 and 34 14 188. The specified setting of the particle sizes according to the invention at from 50 to 1000 nm preferably takes place by the methods described in DE-C-12 60 135 and DE-A-28 26 925, or in Applied Polymer Science, Vol. 9 (1965), page 2929. The use of polymers with different particle sizes is known, for example, from DE-A-28 26 925 and U.S. Pat. No. 5,196,480.

The novel molding compositions comprise, as component C, from 1 to 50% by weight, preferably from 10 to 25% by weight, particularly preferably from 12 to 20% by weight, of a copolymer made from the following monomers:

c1) as component C1, from 75 to 90% by weight, preferably from 77 to 90% by weight, particularly preferably from 81 to 90% by weight, of at least one vinylaromatic monomer, and c2) as component C2, from 10 to 25% by weight, preferably from 10 to 23% by weight, particularly preferably from 10 to 19% by weight, in particular from 15 to 19% by weight, of acrylonitrile and/or methacrylonitrile.

Suitable vinylaromatic monomers are the abovementioned monomers C1 and the vinylaromatic monomers mentioned above as component B21. Component C is preferably an amorphous polymer as described above for graft B2. In one embodiment of the invention component C comprises a copolymer of styrene and/or α-methylstyrene with acrylonitrile. The acrylonitrile content in these copolymers of component C here is not above 25% by weight and is generally from 10 to 25% by weight, preferably from 10 to 22% by weight, particularly preferably from 10 to 19% by weight, in particular from 15 to 19% by weight. The low acrylonitrile content of component C probably results in better compatibility with component A, giving better mechanical properties. Component C also includes the free, ungrafted styrene-acrylonitrile copolymers produced during the graft copolymerization to prepare component B. Depending on the conditions selected in the graft copolymerization for preparing the graft copolymer B, it is possible that a sufficient proportion of component C may already have been formed during the graft copolymerization. However, it will generally be necessary for the products obtained during the graft copolymerization to be blended with additional and separately prepared component C.

This additional and separately prepared component C may preferably be a styrene-acrylonitrile copolymer, an α-methylstyrene-acrylonitrile copolymer or an α-methylstyrene-styrene-acrylonitrile terpolymner. It is important that the acrylonitrile content in the copolymers C does not exceed 25% by weight, in particular 19% by weight. The copolymers may be used for component C either individually or as a mixture, and the additional and separately prepared component C of the novel molding compositions may, for example, therefore be a mixture of a styrene-acrylonitrile copolymer (PSAN) and an α-methylstyrene-acrylonitrile copolymer. The acrylonitrile content of the different copolymers of component C may also vary. However, component C is preferably composed simply of one or more styrene-acrylonitrile copolymers, which may have differing acrylonitrile content. In a particularly preferred embodiment component C is composed simply of one styrene-acrylonitrile copolymer.

The novel molding compositions may comprise, as component D, from 0 to 25% by weight of other compatible polymers homogeneously miscible with components A and/or C or dispersible in these. Examples of those which may be used are appropriate conventional grafted rubbers, such as ethylene-vinyl acetate rubbers, silicone rubbers, polyether rubbers, hydrogenated diene rubbers, polyalkenamer rubbers, acrylate rubbers, ethylene-propylene rubbers, ethylene-propylene-diene rubbers and butyl rubbers, methyl methacrylate-butadiene-styrene (MBS) rubbers, methyl methacrylate-butyl acrylate-styrene rubbers, as long as these are miscible with the mixed phase formed from components A, B and C or are dispersible within this. Preference is given to acrylate rubber, ethylene-propylene (EP) rubber and ethylene-propylene-diene (EPDM) rubber. It is also possible to use polymers or copolymers miscible or compatible with the mixed phase formed from components B and C, for example polycarbonates, polymethacrylates, in particular PMMA, polyphenylene ethers or syndiotactic polystyrene.

It is also possible in particular to use reactive rubbers which link to the polyester (component A) via a covalent bond, for example particulate acrylate rubbers and/or polyolefin rubbers grafted with anhydrides, such as maleic anhydride, or with epoxy compounds, such as glycidyl methacrylate. Finally, it is also possible to use one or more polymers or copolymers which are present at the boundary between the amorphous phase formed from components B and/or C and the crystalline or semicrystalline phase formed from component A, and thus improve the adhesion between the two phases. Examples of polymers of this type are graft copolymers made from PBT and PSAN and segmented copolymers, such as block copolymers or multiblock copolymers made from at least one segment of PBT with $M_W>1000$ and at least one segment of PSAN or a segment compatible/miscible with PSAN with $M_W>1000$.

The novel molding compositions comprise, as component E, from 0 to 10% by weight of conventional additives. Examples of additives of this type are: UV stabilizers, oxidation retarders, lubricants, mold-release agents, dyes, pigments, colorants, nucleating agents, antistats, antioxidants, stabilizers to improve thermal stability, to increase light stability, to raise hydrolysis resistance and chemicals resistance, agents to prevent decomposition by heat, and in particular the lubricants useful for producing moldings. These other additives may be metered in at any stage of the preparation process, but preferably at an early juncture so as to make use at an early stage of the stabilizing effects (or other specific effects) of the additive. Heat stabilizers or oxidation retarders are usually metal halides (chlorides, bromides or iodides) derived from metals in group I of the Periodic Table of the Elements (for example Li, Na, K or Cu).

Suitable stabilizers are the usual hindered phenols, or else vitamin E or compounds of similar structure. HALS stabilizers (hindered amine light stabilizers) are also suitable, as are benzophenones, resorcinols, salicylates, benzotriazoles and other compounds (for example Irganox®, Tinuvin®, such as Tinuvin® 770 (HALS absorbers, bis(2,2,6,6-tetramethyl-4-piperidyl) sebacate) or Tinuvin® P (UV absorber—(2H-benzotriazol-2-yl)-4-methylphenol) or Topanol®). The amounts of these usually used are up to 2% by weight, based on the entire mixture.

Examples of suitable lubricants and mold-release agents are stearic acids, stearyl alcohol, stearates and in general higher fatty acids, derivatives of these and appropriate fatty acid mixtures having from 12 to 30 carbon atoms. The amounts of these additives are from 0.05 to 1% by weight.

Other possible additives are silicone oils, oligomeric isobutylene, or similar substances. The usual amounts are from 0.05 to 5% by weight. It is also possible to use pigments, dyes, color brighteners, such as ultramarine blue, phthalocyanines, titanium dioxide, cadmium sulfides and derivatives of perylenetetracarboxylic acid. Another additive which may be used is carbon black, either pure or as a masterbatch.

The amounts used of processing aids and stabilizers, such as UV stabilizers, lubricants and antistats, are usually from 0.01 to 5% by weight, based on the entire molding composition.

It is also possible to use amounts of, for example, up to 5% by weight, based on the entire molding composition, of nucleating agents, such as talc, calcium fluoride, sodium phenylphosphinate, alumina or finely divided polytetrafluoroethylene. Amounts of up to about 5% by weight, based on the molding composition, of plasticizers, such as dioctyl phthalate, dibenzyl phthalate, butyl benzyl phthalate, hydrocarbon oils, N-(n-butyl)benzenesulfonamide, or o- or p-tolueneethylsulfonamide are advantageously added. It is also possible to add amounts of up to about 5% by weight, based on the molding composition, of colorants, such as dyes and pigments.

Components A, B and C and, if desired, D and E may be mixed in any desired manner using any of the known methods. Components A to C and, if desired, D and E may be mixed as such, or else in the form of mixtures of one component with one or more of the other components. For example, component B may be premixed with some or all of component C and, if desired, with components D and E, and then mixed with the other components. If components B and C have been prepared, for example, by emulsion polymerization, the resultant polymer dispersions may be mixed with one another, followed by joint precipitation of the polymers and work-up of the polymer mixture. However, it is preferable to blend components B and C by joint extrusion, kneading or rolling of the components, and if necessary components B and C may have been isolated previously from the solution or aqueous dispersion obtained during the polymerization. The novel thermoplastic molding compositions may, for example, be prepared by melting component A in an extruder with each of the components B and C or with a mixture made from these and, if desired, with components D and E.

The novel molding compositions may be processed by known methods of thermoplastic processing to give moldings. In particular, these may be produced by thermoforming, extruding, injection molding, calendering, blow molding, compression molding, press sintering, thermoforming or sintering, preferably by injection molding. The moldings which can be produced from the novel molding compositions are also provided by the present invention.

The moldings produced from the novel molding compositions have only low emissions of volatile constituents with a discernible odor. The odor performance of polymer materials is assessed to DIN 50011/PV 3900 and this applies to components in motor vehicle interiors. For the novel moldings the result of odor testing to this standard is generally better than grade 5, preferably better than grade 4.5. The carbon emission of the moldings to PV 3341 is generally<60 $\mu$g/g, preferably<50 $\mu$g/g, particularly preferably<40 $\mu$g/g.

The novel moldings also have good heat resistance. The Vicat B softening point is generally>120° C., preferably>130° C., particularly preferably>140° C.

The novel moldings also have good heat-aging performance.

The novel moldings also have good mechanical properties. For example, their modulus of elasticity is generally>1800 MPa, preferably>2000 MPa, their yield stress is generally>40 MPa, preferably>4 MPa, their ISO 179/1eU impact strength is generally>50 kJ per m$^2$, preferably>80 kJ per m$^2$, their impact strength without prior heat-aging to ISO 179/1eA is generally>10 kJ per m$^2$ and their flowability (MVR 260° C./under 5 kp load) is>20 g/cm$^3$, preferably >25 g/cm$^3$.

Even after 1000 h of continuous heat-aging at 130° C., the novel moldings do not show brittle failure in the penetration test at −20° C. (3 mm sheet thickness, to ISO 6603/2).

The high heat resistance and good heat-aging resistance, and the UV resistance and good mechanical properties and very good surface properties of the novel moldings make them suitable for a wide variety of applications. The following are mentioned merely as examples: applications in the household and sanitary sectors, such as plastic parts in shaving devices, applications in the sport and leisure sectors, such as garden tools and garden equipment, and also applications in motor vehicles in the internal and external sectors.

The properties, for example the good emission performance and good mechanical properties of the novel moldings makes them particularly suitable for applications in motor vehicle interiors. The novel moldings produced from the novel molding compositions are therefore in particular protective coverings, stowage compartments, parts of dashboards, door breasts, parts for the center console, and also retaining elements for radio and air-conditioning system, covers for the center console, covers for radio, air-conditioning system and ashtray, prolongations of the center console, stowage pockets, storage areas for the driver's door and front passenger's door, storage areas for the center console, components for the driver's and passenger's seats, such as seat coverings, defroster ducts, internal mirror housings, protective surrounds for instruments, instrument sockets, upper and lower shells for the steering column, air-conveying ducts, air blowers and adapters for personal airflow devices and defroster ducts, door side coverings, coverings in the knee area, air-outlet nozzles, defroster apertures, switches and levers. These applications are just some examples of possible applications in motor vehicle interiors.

The very good surface properties of the novel moldings mean that they do not have to be surface-coated. They are also tougher than glass-fiber-reinforced moldings.

The invention also provides the use of the novel molding compositions for producing the moldings mentioned.

The examples below describe the invention in greater detail:

EXAMPLES

Examples 1 to 4 and Comparative Examples C1 and C2

The amounts of polybutylene terephthalate (PBT), standard or recycled polyethylene terephthalate (PET), graft rubbers P1 and P2, copolymers PSAN 1, PSAN 2 and PSAN 3, reactive rubbers and additives given in Table 1 were mixed in a screw-extruder at from 250 to 270° C. The test specimens corresponding to the relevant DIN standards were injection-molded from the resultant molding compositions.

Modifier 1 is an ethyl acrylate-methyl methacrylate-glycidyl methacrylate rubber from Elf Atochem (Lotader®) Modifier 2 is a butyl acrylate-MMA-glycidyl methacrylate rubber from Rohm & Haas (Paraloid®).

P1 is a fine-particle ASA graft rubber with 25% by weight of acrylonitrile in the SAN graft shell with an average particle size of about 100 nm.

P2 is a coarse-particle ASA graft rubber with 25% by weight of acrylonitrile in the SAN graft shell and with an average particle diameter of about 500 nm.

PSAN 1 is a styrene-acrylonitrile copolymer with 19% by weight of acrylonitrile.

PSAN 2 is a styrene-acrylonitrile copolymer with 35% by weight of acrylonitrile.

Emission performance was assessed DIN 3341.

Table 2 gives the results of the emission performance test and the results of the mechanical tests also carried out.

We claim:

1. A molding for motor vehicle interiors made from a thermoplastic molding composition comprising, based on the total of components A to C and, if desired, D and E, which in total give 100% by weight,
   a) as component A, from 10 to 98% by weight of at least one aromatic polyester,
   b) as component B, from 1 to 50% by weight of at least one particulate graft copolymer whose soft phase has a glass transition temperature below 0° C. and whose median particle size is from 50 to 1000 nm,
   c) as component C, from 1 to 50% by weight of at least one copolymer made from the following monomers
      c1) as component C1, from 75 to 90% by weight of at least one vinylaromatic monomer, and
      c2) as component C2, from 10 to 25% by weight of acrylonitrile and/or methacrylonitrile,
   d) as component D, from 0 to 25% by weight of other compatible polymers homogeneously miscible with components A and/or C or dispersible in these, and
   e) as component E, from 0 to 10% by weight of conventional additives selected from the group consisting of UV stabilizers, carbon black, pigments, oxidation retarders, lubricants and mold-release agents.

2. A molding as claimed in claim 1, wherein component A is composed of
   a1) from 60 to 100% by weight of polybutylene terephthalate and
   a2) from 0 to 40% by weight of polyethylene terephthalate.

TABLE 1

| Starting material [% by weight] | Comparative Example C1 | Comparative Example C2 | Example 1 | Example 2 | Example 3 | Example 4 |
|---|---|---|---|---|---|---|
| PBT | 74.4 | 63.4 | 78.4 | 65.4 | 77.4 | 75.4 |
| Modifier 1 | | | | | 6 | |
| Modifier 2 | | | | | | 8 |
| P1 | 12 | 12.5 | 10 | 10.5 | 7.5 | 7.5 |
| P2 | | 5 | | 5 | | |
| PSAN 1 | | | 10 | 17.5 | 7.5 | 7.5 |
| PSAN 2 | 2 | 17.5 | | | | |
| Nucleating agent | 0.1 | 0.1 | 0.1 | 0.1 | 0.1 | 0.1 |
| Carbon black | 1.5 | 1.5 | 1.5 | 1.5 | 1.5 | 1.5 |

TABLE 2

| | Comparative Example C1 | Comparative Example C2 | Example 1 | Example 2 | Example 3 | Example 4 |
|---|---|---|---|---|---|---|
| Flowability measured by MVR 260/5 [cm$^3$/10 min] | 56 | 59 | 60 | 65 | 30 | 35 |
| Impact strength to ISO 179/1eU [kJ/m$^2$] | 120 | 130 | 145 | 140 | Not determined | Not determined |
| Impact strength to ISO 179/1eU at −40° C. [kJ/m$^2$] | 50 | 58 | 65 | 65 | 45 | 80 |
| Notched impact strength To ISO 179/1eA [kJ/m$^2$] | 6 | 7 | 8 | 9 | 15 | 14 |
| Modulus of elasticity to DIN 53457 [MPa] | 2400 | 2450 | 2500 | 2450 | 2300 | 2200 |
| Penetration energy to ISO 6603/2 [Nm] | 10 | 12 | 18 | 19 | 41 | 45 |
| Carbon emission to PV 3341 [□g C/g] | 70 | 65 | 35 | 30 | 49 | 38 |

3. A molding as claimed in claim 1, wherein component B is composed of b1) from 50 to 90% by weight of a particulate graft base B 1 made from the following monomers
- b1.1) as component B11, from 75 to 99.9% by weight of a $C_1$–$C_{10}$-acrylate,
- b1.2) as component B12, from 0.1 to 10% by weight of at least one polyfunctional monomer having at least two non-conjugated olefinic double bonds, and
- b1.3) as component B13, from 0 to 24.9% by weight of one or more other copolymerizable monomers, and b2) from 10 to 50% by weight of a graft B2 made from the following monomers
- b2.1) as component B21, from 50 to 90% by weight of a vinyl aromatic monomer, and
- b2.2) as component B22, from 10 to 50% by weight of acrylonitrile and/or methacrylonitrile.

4. A molding as claimed in claim 1, wherein components B21 and/or C1 are unsubstituted styrene.

5. A molding as claimed in claim 1, wherein component B1 is composed of components B11 and B12.

6. A molding as claimed in claim 1 having one or more of the following features:
- -PV 3341 carbon emission<50 µg of carbon/g
- -a grade better than 5 as the result of the DIN 50 011/PV 3900 odor test
- -Vicat B softening point>120° C.

7. A method for the production of moldings for motor vehicle interiors as defined in claim 1, encompassing the step of thermoforming, extruding, injection molding, calendering, blow molding, compression molding, press sintering, or sintering of said molding compositions.

* * * * *